(12) United States Patent  
Suzuki et al.

(10) Patent No.: US 7,965,427 B2
(45) Date of Patent: Jun. 21, 2011

(54) COLOR PROCESSING APPARATUS AND ITS METHOD

(75) Inventors: Takahiro Suzuki, Tokyo (JP); Osamu Yamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 11/470,375

(22) Filed: Sep. 6, 2006

(65) Prior Publication Data

US 2007/0053023 A1 Mar. 8, 2007

(30) Foreign Application Priority Data

Sep. 7, 2005 (JP) ................................ 2005-259602

(51) Int. Cl.
  *G06F 15/00* (2006.01)
  *G03F 3/08* (2006.01)
  *H04N 9/73* (2006.01)
(52) U.S. Cl. ....... 358/518; 358/1.9; 358/520; 348/223.1
(58) Field of Classification Search .................. None
  See application file for complete search history.

(56) References Cited

U.S. PATENT DOCUMENTS

| 5,917,939 | A | 6/1999 | Ohta et al. |
| 6,104,829 | A | 8/2000 | Nakajima |
| 6,434,266 | B1 | 8/2002 | Kanno et al. |
| 6,724,507 | B1 | 4/2004 | Ikegami et al. |
| 6,947,589 | B2 | 9/2005 | Newman et al. |
| 6,987,567 | B2 | 1/2006 | Takahashi et al. |
| 7,013,042 | B1 | 3/2006 | Yamada et al. |
| 7,623,717 | B2 * | 11/2009 | Sadovsky et al. ............. 382/232 |
| 7,751,081 | B2 * | 7/2010 | Huang et al. ................... 358/1.9 |
| 2002/0060803 | A1 | 5/2002 | Iida et al. |
| 2002/0071605 | A1 | 6/2002 | Iida et al. |
| 2002/0135687 | A1 * | 9/2002 | Nakajima et al. .......... 348/231.3 |
| 2003/0048464 | A1 | 3/2003 | Yamada et al. |
| 2003/0202194 | A1 * | 10/2003 | Torigoe et al. ................. 358/1.9 |
| 2004/0066533 | A1 * | 4/2004 | Nakajima ..................... 358/1.15 |
| 2004/0095600 | A1 * | 5/2004 | Nitta et al. .................... 358/1.15 |
| 2004/0201727 | A1 * | 10/2004 | Ichikawa et al. ........... 348/223.1 |

(Continued)

FOREIGN PATENT DOCUMENTS

JP 2000-83177 A 3/2000

(Continued)

OTHER PUBLICATIONS

Office Action dated Nov. 13, 2009 in JP 2005-259602.

*Primary Examiner* — Twyler L Haskins
*Assistant Examiner* — Barbara D Reinier
(74) *Attorney, Agent, or Firm* — Fitzpatrick, Cella, Harper & Scinto

(57) ABSTRACT

When a whole input gamut is mapped into an output gamut, even a gamut range which is not used in practice is mapped into the output gamut. This causes a saturation drop or tone loss. In order to solve this problem, image data obtained by the first device is input and an obtaining condition of the input image data is obtained. On the basis of the obtaining condition, the first gamut information of the input image data is obtained from a table showing the relationship between the output gamut of the first device and the obtaining condition. On the basis of the first gamut information and the second gamut information which indicates the gamut of the second device, the input image data is mapped into the gamut indicated by the second gamut information.

5 Claims, 13 Drawing Sheets

U.S. PATENT DOCUMENTS

| | | |
|---|---|---|
| 2005/0068555 A1 | 3/2005 | Katou |
| 2005/0083346 A1 | 4/2005 | Takahashi et al. |
| 2005/0219585 A1 | 10/2005 | Suzuki et al. |
| 2005/0219586 A1 | 10/2005 | Suzuki et al. |
| 2005/0237553 A1 | 10/2005 | Takahashi et al. |
| 2006/0274286 A1 * | 12/2006 | Morejon et al. ............ 353/85 |

FOREIGN PATENT DOCUMENTS

| | | |
|---|---|---|
| JP | 2003-179763 | 6/2003 |
| JP | 2005-109930 | 4/2005 |

* cited by examiner

F I G. 1
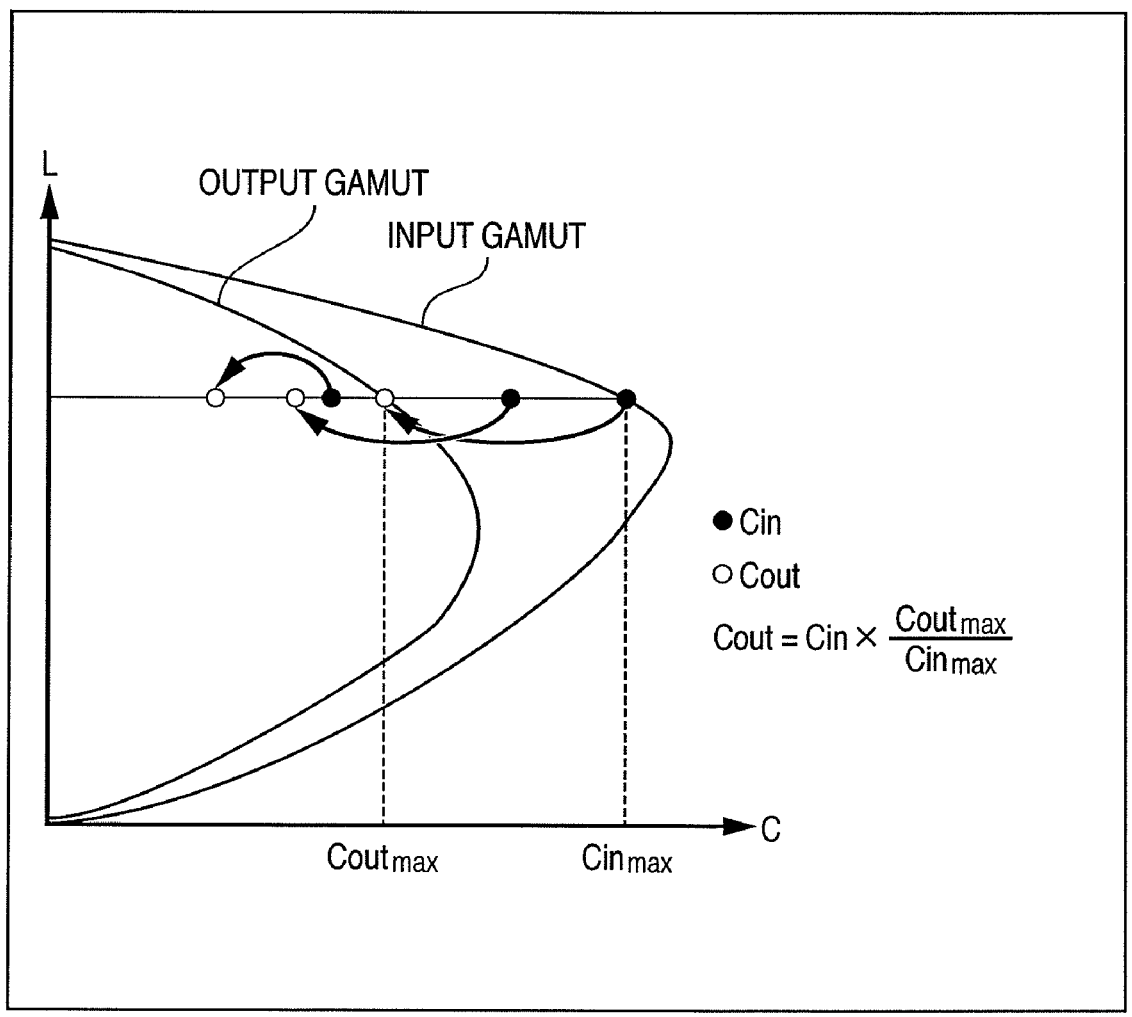

FIG. 7

| R | G | B | L | a | b |
|---|---|---|---|---|---|
| 0 | 0 | 0 | 0 | 0 | 0 |
| 0 | 0 | 32 | …… | …… | …… |
| …… | …… | …… | …… | …… | …… |
| …… | …… | …… | …… | …… | …… |
| …… | …… | …… | …… | …… | …… |
| …… | …… | …… | …… | …… | …… |
| …… | …… | …… | …… | …… | …… |
| 255 | 255 | 224 | …… | …… | …… |
| 255 | 255 | 255 | 100 | 0 | 0 |

FIG. 9

| SENSING CONDITION | PRACTICAL GAMUT |
|---|---|
| CONDITION 1 | GAMUT a |
| CONDITION 2 | GAMUT b |
| CONDITION 3 | GAMUT c |
| CONDITION 4 | GAMUT d |

COLOR PROCESSING APPARATUS AND ITS METHOD

BACKGROUND OF THE INVENTION

1. Field of the Invention

The present invention relates to color processing for mapping image data of the first device into the gamut of the second device.

2. Description of the Related Art

Recently, a system has become popular which inputs an image by an image input device such as a digital camera, color scanner, or the like, displays and confirms the image by using an image display device such as a CRT, LCD, or the like, and outputs the image by an image output device such as a color printer or the like. Such a system performs color matching in order to absorb differences in color appearance caused by differences between a gamut (to be referred to as an "input gamut" hereinafter) of a color space on which the image input device records an image and a gamut (to be referred to as an "output gamut" hereinafter) of the image display device or image output device. More specifically, the system performs color matching to execute gamut mapping and correct differences in color appearance between the devices.

Various methods of gamut mapping have been proposed. Particularly, when performing gamut mapping to a photo image, a mapping method of preserving the tone of the photo image is used.

FIGS. 1 and 2 are views showing examples of cross sections (LC planes) of an input gamut and output gamut on a given hue H in a CIELAB space.

FIG. 1 shows the following method. In each hue plane, a maximum saturation $Cin_{max}$ for each lightness value L of the input gamut is mapped to a maximum saturation $Cout_{max}$ of the corresponding lightness value L of the output gamut. The color inside the gamut is mapped to a color of the output gamut having a ratio $Cout/Cout_{max}$ which corresponds to the saturation ratio $Cin/Cin_{max}$ of the color to be mapped.

FIG. 2 shows a mapping method of storing a color of the input gamut without any change if the color has a saturation of a predetermined ratio x % of the maximum saturation of the output gamut. If the color has a larger saturation than the predetermined one, it is compressed into the remaining part, i.e., (100−x)%, of the output gamut.

When the gamut mapping method described above is used, the tone reproduced in the input gamut can be generally reproduced in the output gamut. However, when a difference between the saturation values of the input gamut and output gamut is very large, the saturation after mapping greatly decreases as compared to that before mapping in the former mapping method. In the latter mapping method, most tone differences in the compressed part (high saturation part) are lost.

An image input device represented by a digital camera records an image as image data in a color space such as a sRGB color space. However, it does not use the whole gamut of the sRGB color space, i.e., the whole input gamut. This is due to internal arithmetic processing of the image input device.

For example, in a case of a digital camera, an internal color conversion parameter is switched in accordance with the sensing situation, and color conversion processing is performed by using the switched parameter. Whatever sensing situation parameter is used to perform color conversion, only a part of the sRGB gamut as the input gamut is used for recording. A gamut used in the input gamut in practice is called as a practical gamut.

FIG. 3 is a view showing an example of the relationship between the input gamut, practical gamut, and output gamut by using an LC plane.

In most mapping methods including the above-described two examples, because a whole input gamut is mapped into an output gamut, even the gamut range which is not used in practice is mapped on the output gamut. As a result, an unnecessary saturation drop or tone loss occurs.

In contrast, in a technique disclosed in Japanese Patent Laid-Open No. 2000-83177, the color distribution of an input image is analyzed and a gamut existing in the input image is mapped into an output gamut. With this technique, no input gamut range unnecessary for mapping is mapped into the output gamut, and a saturation drop or tone loss can be prevented. However, since this technique changes the mapping (degree of compression) in accordance with the color distribution of the input image, the color of the object may be changed depending on the background color.

SUMMARY OF THE INVENTION

The first aspect of the present invention discloses a method of mapping image data of a first device into a gamut of the second device, comprising the steps of: inputting image data captured by the first device; obtaining a sensing condition of the input image data; obtaining first gamut information corresponding to the sensing condition from a table which stores a relationship between a gamut and a sensing condition; obtaining second gamut information which indicates a gamut of the second device; and mapping, on the basis of the first gamut information and the second gamut information, the input image data into the gamut indicated by the second gamut information.

According to the present invention, upon gamut mapping, an unnecessary saturation drop or tone loss can be prevented.

In addition, a change in color reproduction based on the color distribution of an image can be prevented.

Further features of the present invention will become apparent from the following description of exemplary embodiments with reference to the attached drawings.

BRIEF DESCRIPTION OF THE DRAWINGS

FIGS. 1 and 2 are graphs for explaining gamut mapping of a photo image;

FIG. 7 is a view showing an example of a data format of output gamut data;

FIG. 9 is a view showing an example of a table illustrating correspondence between an obtaining condition and a practical gamut;

DESCRIPTION OF THE EMBODIMENT

Image processing of an embodiment according to the present invention will be described in detail hereinafter with reference to the accompanying drawings.

First Embodiment

Arrangement of Apparatus

Figure 4:
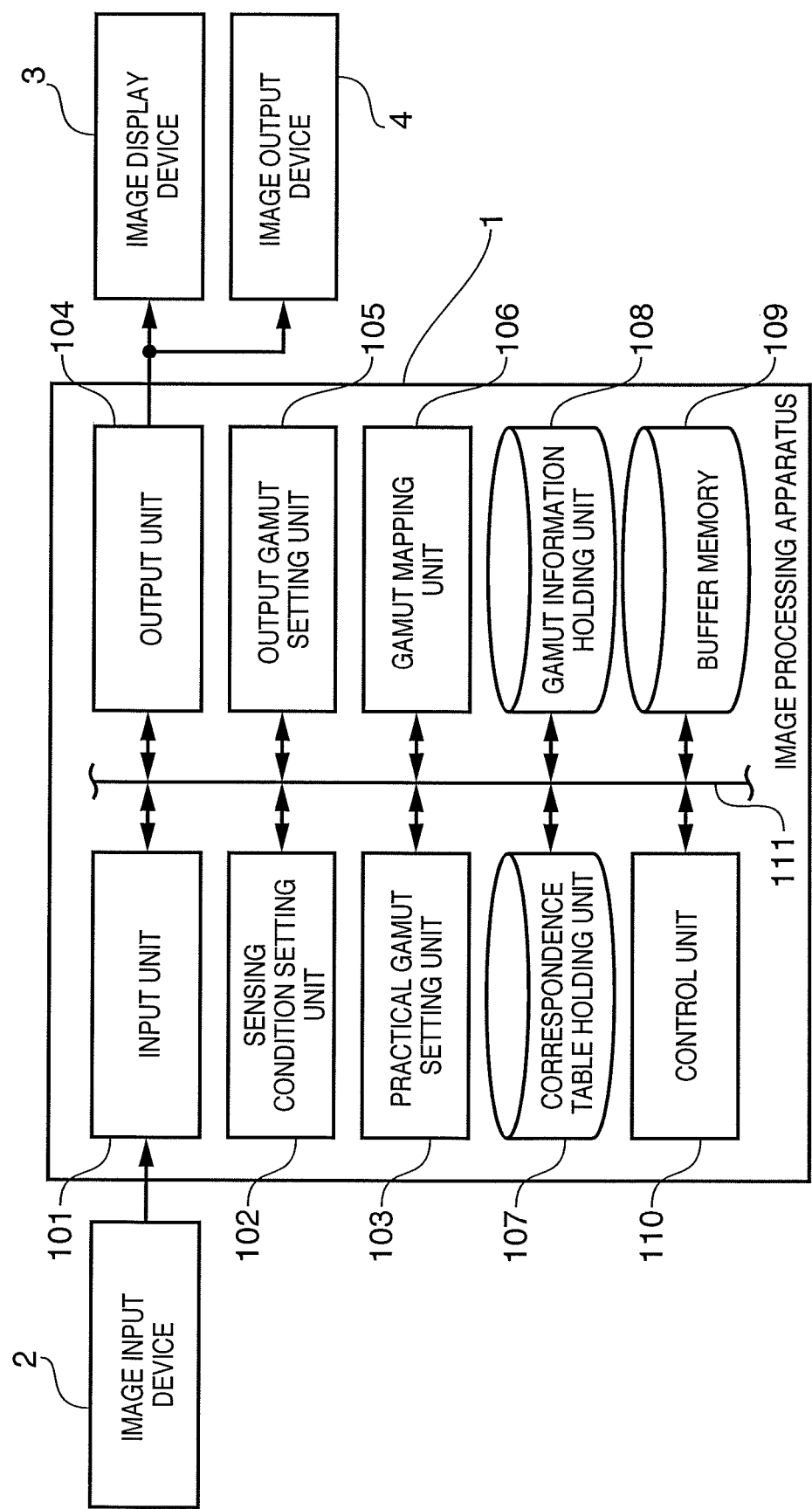
FIG. 4 is a block diagram showing the arrangement of an image processing apparatus of an embodiment.

FIG. 4 is a block diagram showing the arrangement of an image processing apparatus 1.

An input unit 101 receives image data from an input device 2 such as a digital camera or the like. An obtaining condition setting unit 102 sets an obtaining (sensing) condition upon capturing (sensing) the input image data. On the basis of the image obtaining condition set by the obtaining condition setting unit 102, a practical gamut setting unit 103 sets a practical gamut to be used by the input device 2 in practice. An output unit 104 outputs mapped image data to an image display device 3 such as a monitor or the like or an image output device 4 such as a printer or the like. Note that the input unit 101 and output unit 104 can use a serial bus interface such as Universal Serial Bus (USB), IEEE 1394, and the like. A memory card reader may be used as the input unit 101, and image data may be input from a memory card.

An output gamut setting unit 105 sets an output gamut of an output destination device of the image data. A gamut mapping unit 106 maps, by using the practical gamut set by the practical gamut setting unit 103, the image data received by the input unit 101 into the output gamut set by the output gamut setting unit 105.

A correspondence table holding unit 107 holds a table which shows correspondence between the obtaining (sensing) condition of the image data and the practical gamut. A gamut information holding unit 108 holds gamut information of the input gamut, practical gamut, and output gamut. The correspondence table holding unit 107 and gamut information holding unit 108 are nonvolatile memories such as hard discs.

A buffer memory 109 is a memory such as a RAM for temporarily storing various kinds of data while the data is being calculated.

A control unit 110 is, e.g., a CPU which controls the above-described components through a system bus 111. The control unit 110 performs image processing (to be described later) or the like by executing a program stored in, e.g., a hard disc or ROM while using the buffer memory 109 as a work memory.

[Image Processing]

Figure 5:
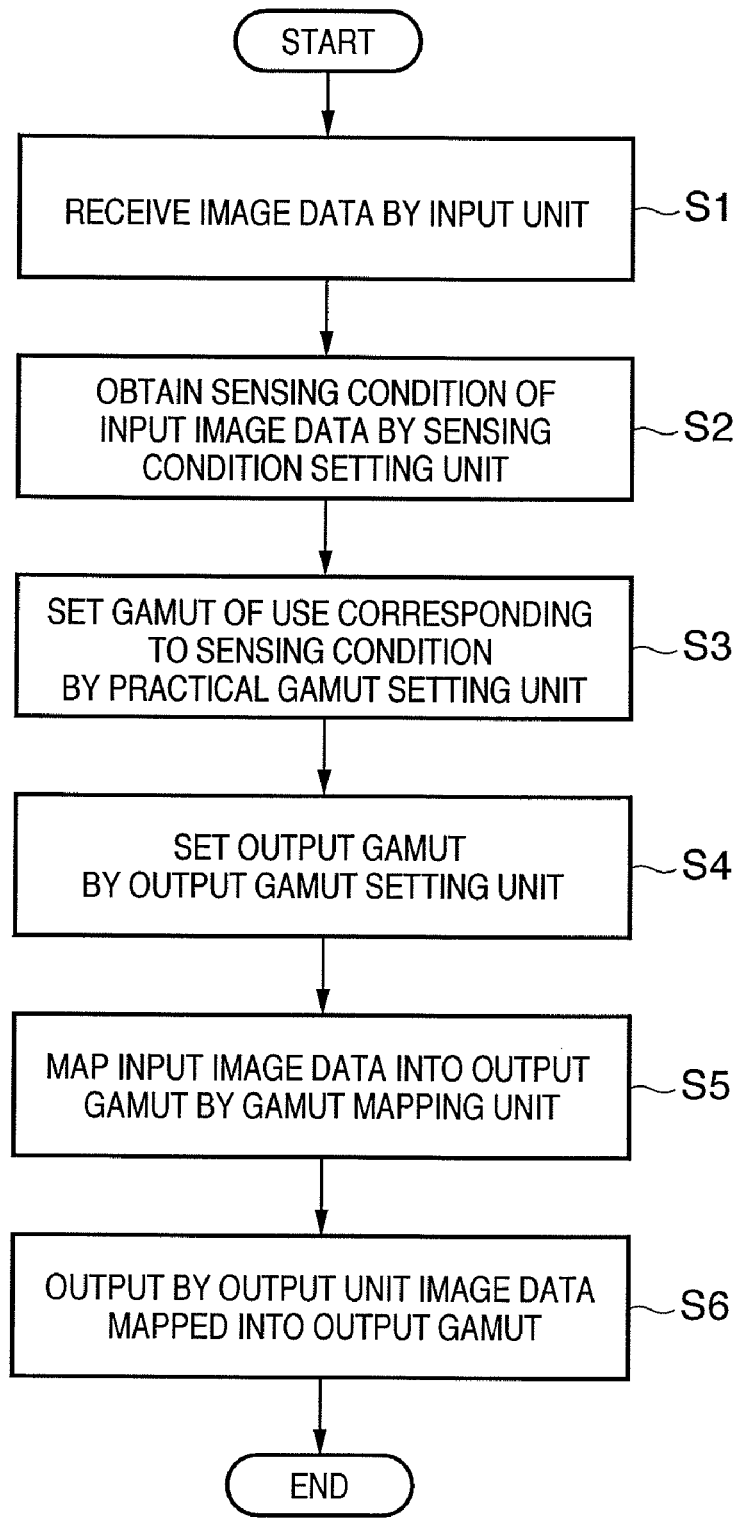
FIG. 5 is a flowchart showing image processing of the image processing apparatus.

FIG. 5 is a flowchart showing image processing of the image processing apparatus 1, which is executed by the control unit 110.

First, the input unit 101 receives image data from the image input device 2 and holds the image data in the buffer memory 109 (S1). Then, the obtaining condition setting unit 102 obtains an obtaining condition of the input image data from the image data held in the buffer memory 109 and input the condition to the practical gamut setting unit 103 (S2).

Figure 6:
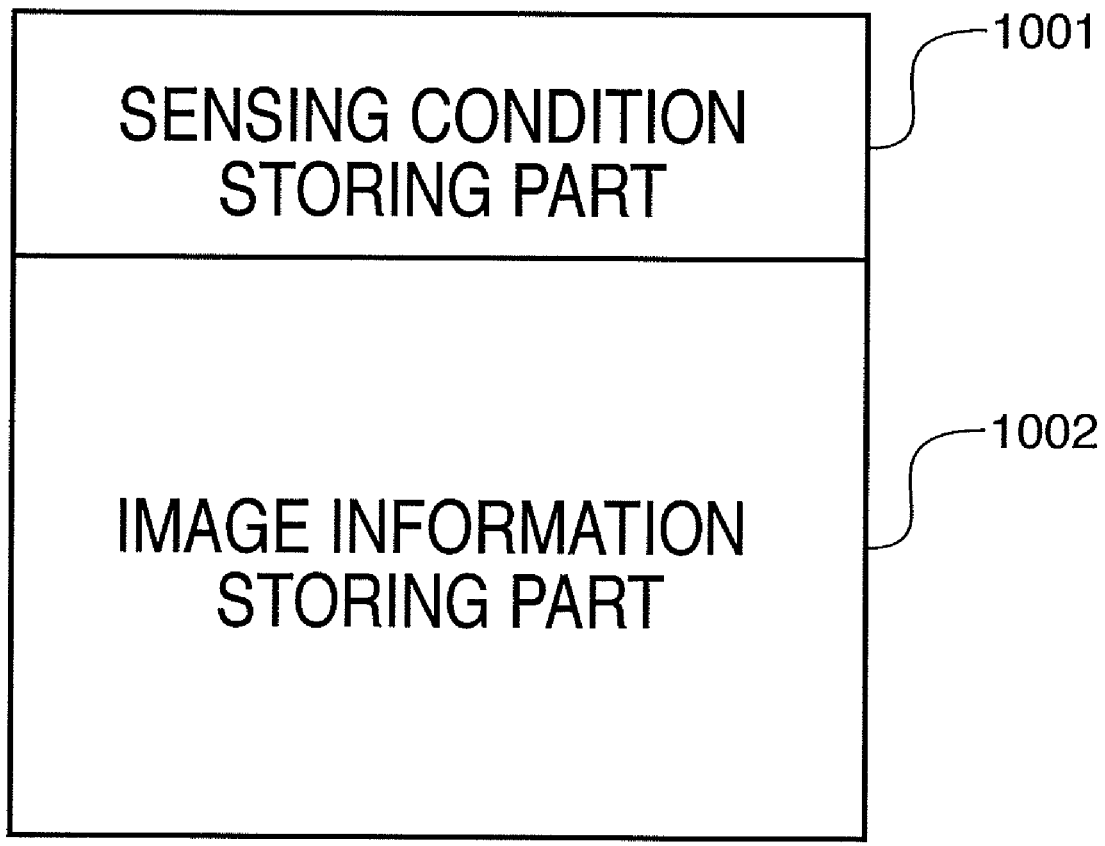
FIG. 6 is a view showing a format example of input image data.

FIG. 6 is a view showing a format example of image data. Image data is comprised of an obtaining condition storing part 1001 which holds information including, for example, a sensing mode of a digital camera upon sensing the image, the focal length of a lens, or the like, and an image information storing part 1002 which holds the image data itself. That is, the obtaining condition setting unit 102 obtains the obtaining condition from the obtaining condition storing part 1001. Examples of sensing modes of a digital camera are a high-definition mode, normal-definition mode, high-quality mode, normal-quality mode, and the like. The obtaining information also includes a color temperature or a setting of a color temperature (fine sky, cloudy sky, indoor (fluorescent light), indoor (incandescent light), evening scene, and the like), ISO sensitivity, a shutter speed, the f-number and the aperture value of the sensing lens, a strobe light setting, and the like.

Next, the practical gamut setting unit 103 sets in the gamut mapping unit 106 a practical gamut corresponding to the obtaining condition of the input image data (S3). A detailed process of the practical gamut setting unit 103 will be described later.

The output gamut setting unit 105 obtains from the gamut information holding unit 108 gamut data of the output destination device of the image data, and sets the obtained gamut data in the gamut mapping unit 106 (S4).

FIG. 7 is a view showing an example of a gamut data format held in the gamut information holding unit 108. Gamut data is recorded as correspondence between 9-sliced device R, G, and B values of R, G, and B values (8 bits), and colorimetry values (CIELAB values) as a color measuring result obtained by inputting the device R, G, and B values into the device.

The gamut mapping unit 106 maps each pixel of the input image data held in the buffer memory 109 into the output gamut on the basis of the practical gamut corresponding to the obtaining condition set in step S3 and the gamut data set in step S4 (S5). A detailed process of the gamut mapping unit 106 will be described later.

The output unit 104 outputs the image data mapped into the output gamut in step S5 to the output destination device (S6).

[Practical Gamut Setting Unit]

Figure 8:
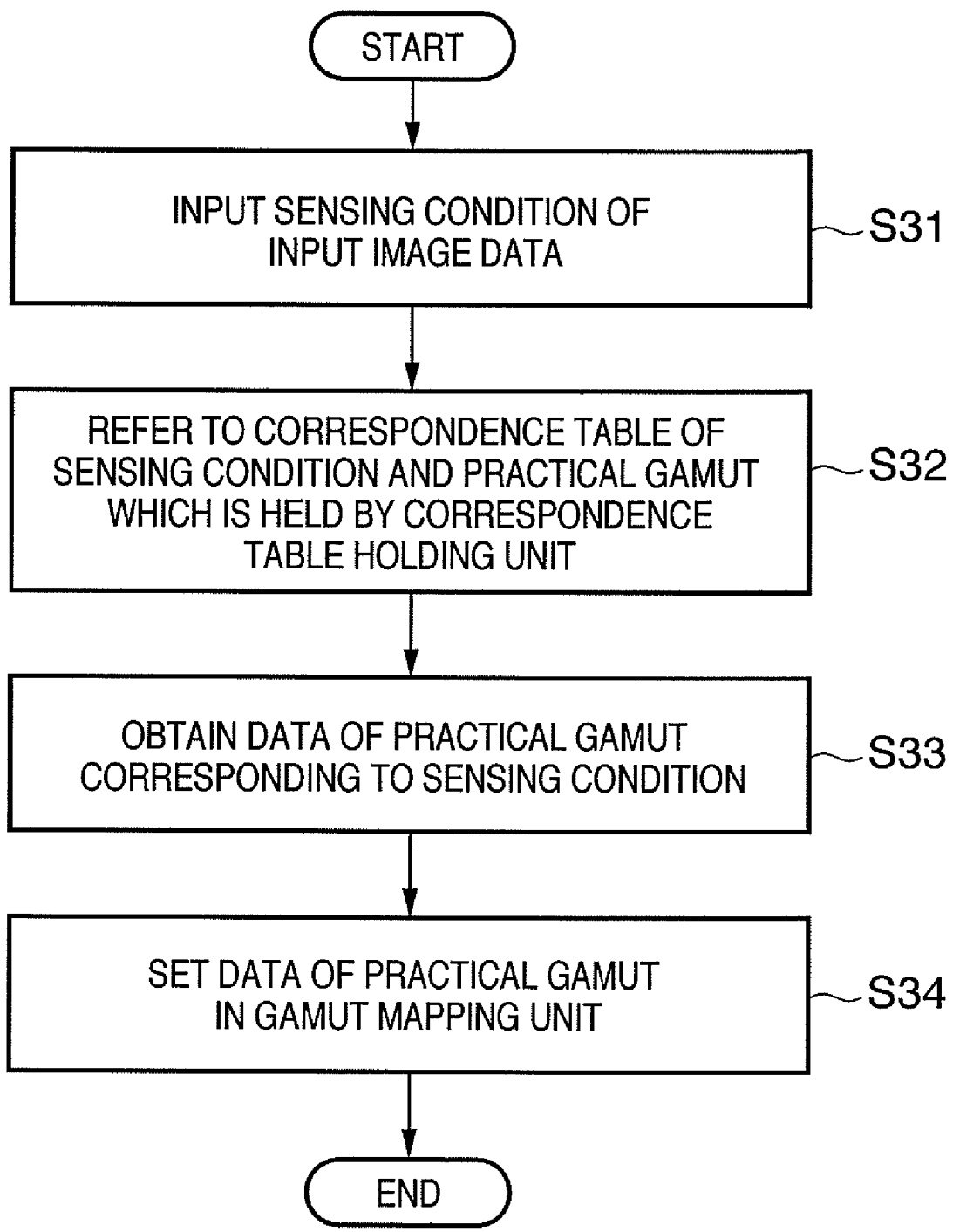
FIG. 8 is a flowchart showing details of a process in a practical gamut setting unit.

FIG. 8 is a flowchart showing the details of the process (S3) of the practical gamut setting unit 103.

First, the obtaining condition of the input image data is input (S31), and the correspondence table of the obtaining condition and practical gamut which is held in the correspondence table holding unit 107 is referred to (S32).

Figure 2:
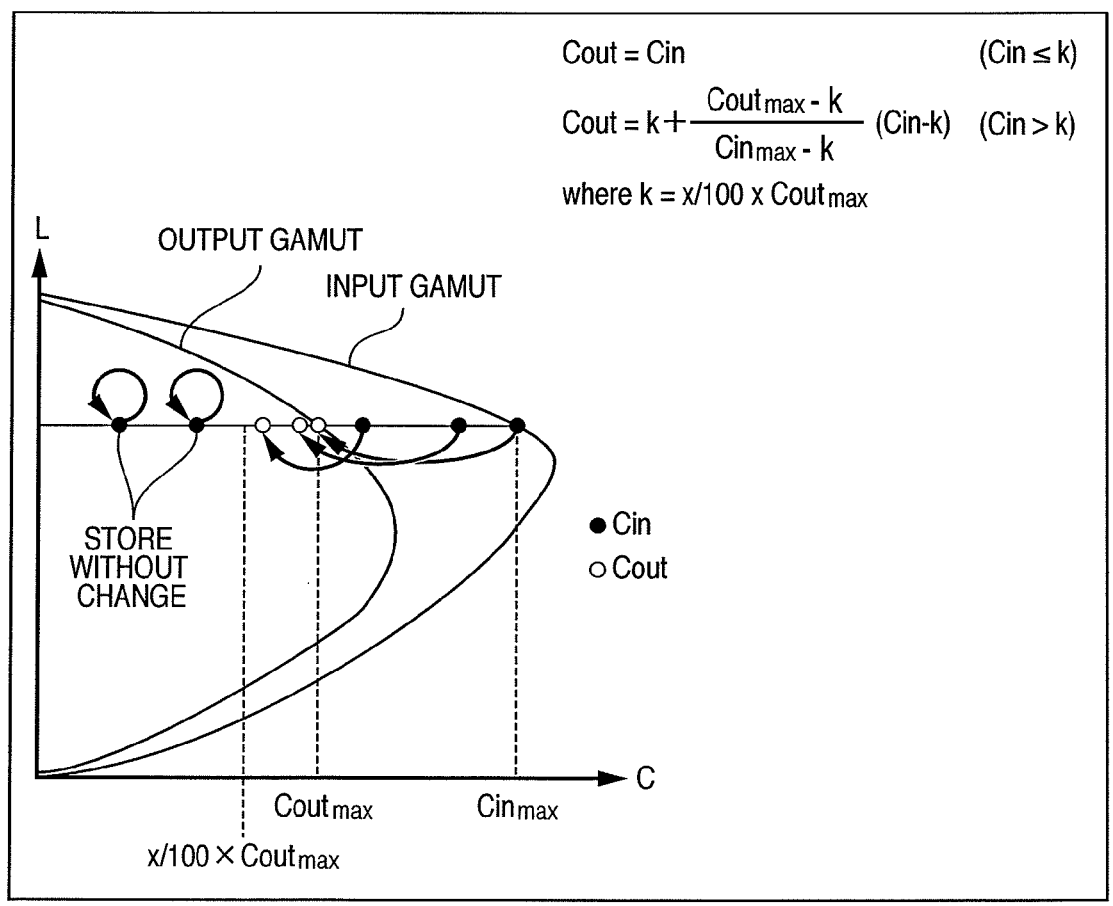
Figure 3:
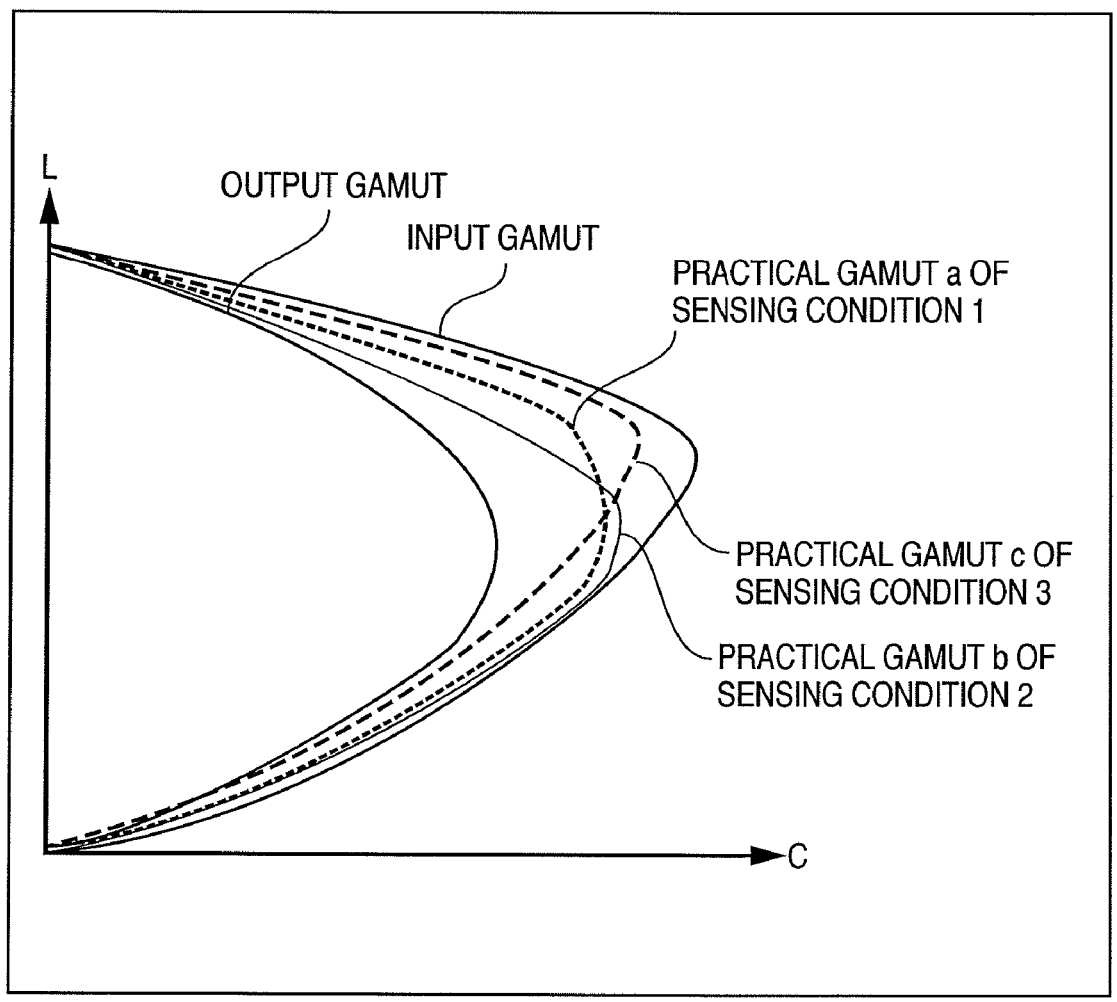
FIG. 3 is a graph showing an input gamut and a gamut used in practice.

FIG. 9 is a view showing an example of the correspondence table which illustrates the correspondence relationship between the sensing conditions and practical gamuts shown in FIG. 3 as an example. In this embodiment, the practical gamut is assumed to be calculated for each obtaining condition in advance, and is described in the correspondence table in correspondence with each obtaining condition. The data format of the practical gamut in the correspondence table is, for example, the same data format as that of the output gamut shown in FIG. 7. A calculation method of the practical gamut will be described later.

With reference to the correspondence table, data of the practical gamut corresponding to the obtaining condition is obtained (S33), and the data of the practical gamut is set in the gamut mapping unit 106 (S34).

[Calculation Method of Practical Gamut]

In the case of a digital camera as an example of the image input device, light from an object is received by a sensor such as a CCD, CMOS, or the like, through a lens and color filter, and rawRGB data is generated. Color conversion depending on the sensing condition, e.g., gain control such as white balance correction, matrix conversion for color conversion, and the like are performed to the rawRGB data, and the resultant data is stored as image data of a color space, e.g., sRGB color space, for recording the image.

When pseudo-RGB data is input as rawRGB data before undergoing internal arithmetic operations by the digital camera and image processing such as gain control which differs depending on the sensing condition, matrix conversion, and the like are performed for the pseudo-RGB data, the practical gamut for each sensing condition can be calculated.

For example, assume that each rawR, G, and B data has 8 bits. Pseudo-R, G, and B data are prepared by slicing the rawR, G, and B data into 9 levels in the ranges ($0 \leq R, G, B \leq 255$) that rawRGB can assume. Then, internal arithmetic image processing to be performed by the digital camera under a given condition is performed to the pseudo-RGB data. In this manner, the practical gamut can be calculated which is output by the digital camera under the given sensing condition.

[Gamut Mapping Unit]

Figure 10:
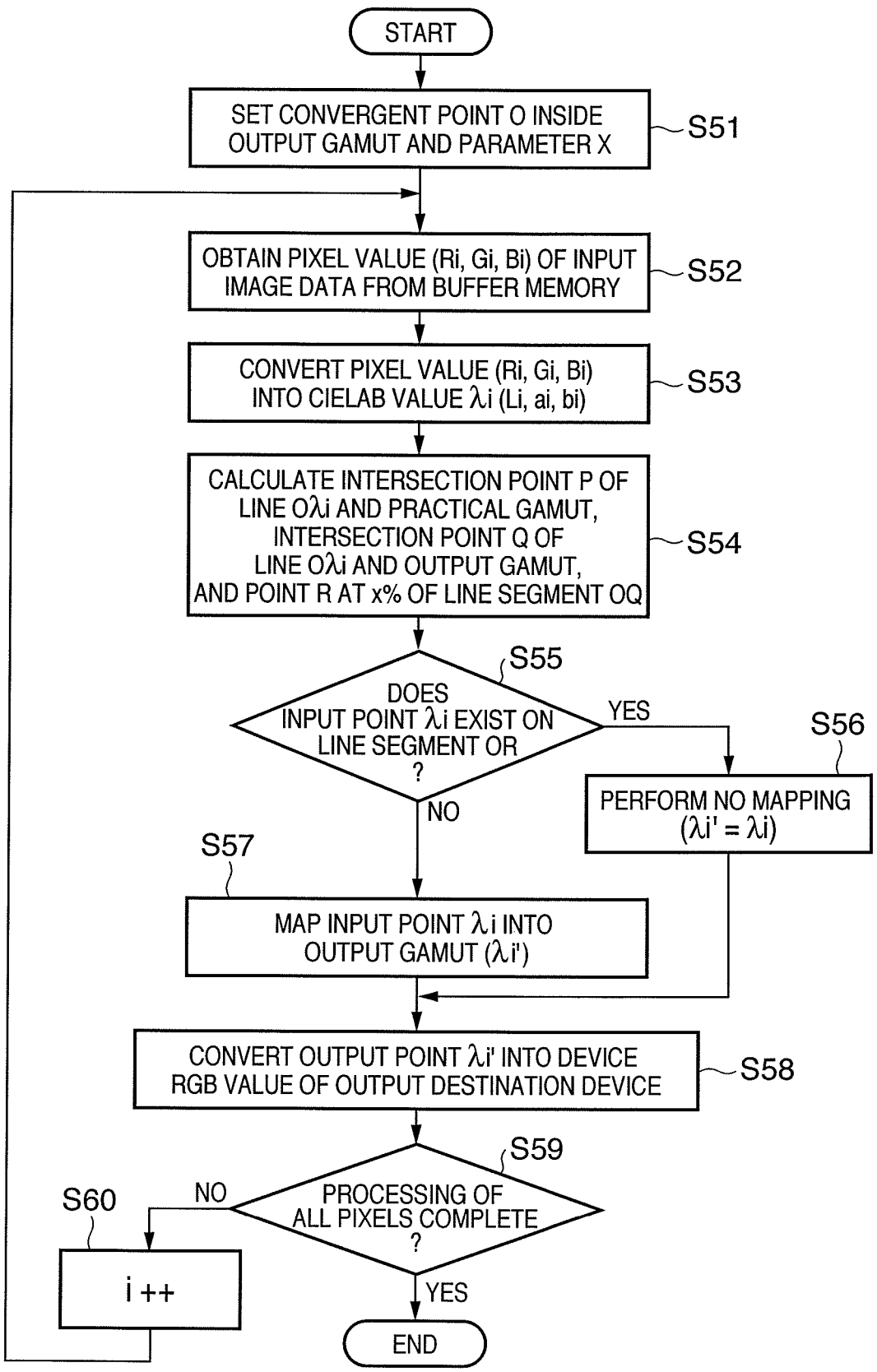
FIG. 10 is a flowchart showing details of a process in a gamut mapping unit.

FIG. 10 is a flowchart showing the details of the process (S5) of the gamut mapping unit 106.

First, a convergent point O inside the output gamut and a parameter X are set (S51). The convergent point O defines a gamut compression direction, and is set to, e.g., a point having a CIELAB value (50, 0, 0). The parameter X is for switching a compression region and incompression region, and details of which will be described later. The convergent point O and parameter X may be held in the gamut mapping unit 106 in advance, or may be input from an external device.

The pixel value (RGB value) of one pixel of the input image data held in the buffer memory 109 is obtained (S52). Assume that a pixel number i is assigned to each pixel of the input image data in an order from upper left to lower right. First, the RGB value of the pixel having the pixel number i=0 is obtained.

Next, the pixel value (RGB value) is converted into a CIELAB value (S53). The process will be described hereinafter while assuming a color space to express the input image is an sRGB color space (IEC 61966-2-1). Let the R, G, B values of the pixel be Ri, Gi, and Bi. Then, the R, G, and B values are converted into CIE tristimulus values X, Y, and Z by:

$$\begin{bmatrix} Xi \\ Yi \\ Zi \end{bmatrix} = \begin{bmatrix} 0.4124 & 0.3576 & 0.1805 \\ 0.2126 & 0.7152 & 0.0722 \\ 0.0193 & 0.1192 & 0.9505 \end{bmatrix} = \begin{bmatrix} Ri \\ Gi \\ Bi \end{bmatrix} \quad (1)$$

Next, assuming a white point is D65, the obtained values are converted into CIELAB values by:

When $Yi/Yn > 0.008856$, $Li^* = 116(Yi/Yn)^{1/3} - 16$;

When $Yi/Yn \leq 0.008856$, $Li^* = 903.29(Yi/Yn)$;

$ai^* = 500[f(Xi/Xn) - f(Yi/Yn)]$;

$bi^* = 200[f(Yi/Yn) - f(Zi/Zn)]$;

When $Xi/Xn > 0.008856$, $f(Xi/Xn) = (X/Xn)^{1/3}$;

When $Xi/Xn \leq 0.008856$, $f(Xi/Xn) = 7.78X/Xn + 16/116$;

When $Yi/Yn > 0.008856$, $f(Yi/Yn) = (Y/Yn)^{1/3}$;

When $Yi/Yn \leq 0.008856$, $f(Yi/Yn) = 7.78Y/Yn + 16/116$;

When $Zi/Zn > 0.008856$, $f(Zi/Zn) = (Z/Zn)^{1/3}$; and

When $Zi/Zn \leq 0.008856$, $f(Zi/Zn) = 7.78Z/Zn + 16/116$ \quad (2)

wherein Xn, Yn, and Zn are the X, Y, and Z values of the white point, respectively.

When the white point is set D65, Xn=95.05, Yn=100.0, and Zn=108.91.

When an input image is expressed on an sRGB color space specified by IEC 61966-2-1, conversion formulas (1) and (2) are used. When an input image is expressed on a color space other than an sRGB color space, formula (1) is changed to the one which corresponds to that color space, and a white point corresponding to the color space is used for conversion into a CIELAB value. In this case, input gamut data also corresponds to data on the color space. Let a pixel value converted into a CIELAB value be (Li, ai, bi), hereinafter.

Next, a line Oλi which connects the convergent point O and an input point λi=(Li, ai, bi), an intersection point P of the line Oλi and the boundary of the practical gamut, and an intersection point Q of the line Oλi and the boundary of the output gamut are calculated. A switching point R between a compression region and incompression region is calculated by using equation (3) and the parameter X (S54).

$$OR = X/100 \times OQ \quad (3)$$

where OR is the distance between the points O and R, and OQ is the distance between the points O and Q.

Figure 11:
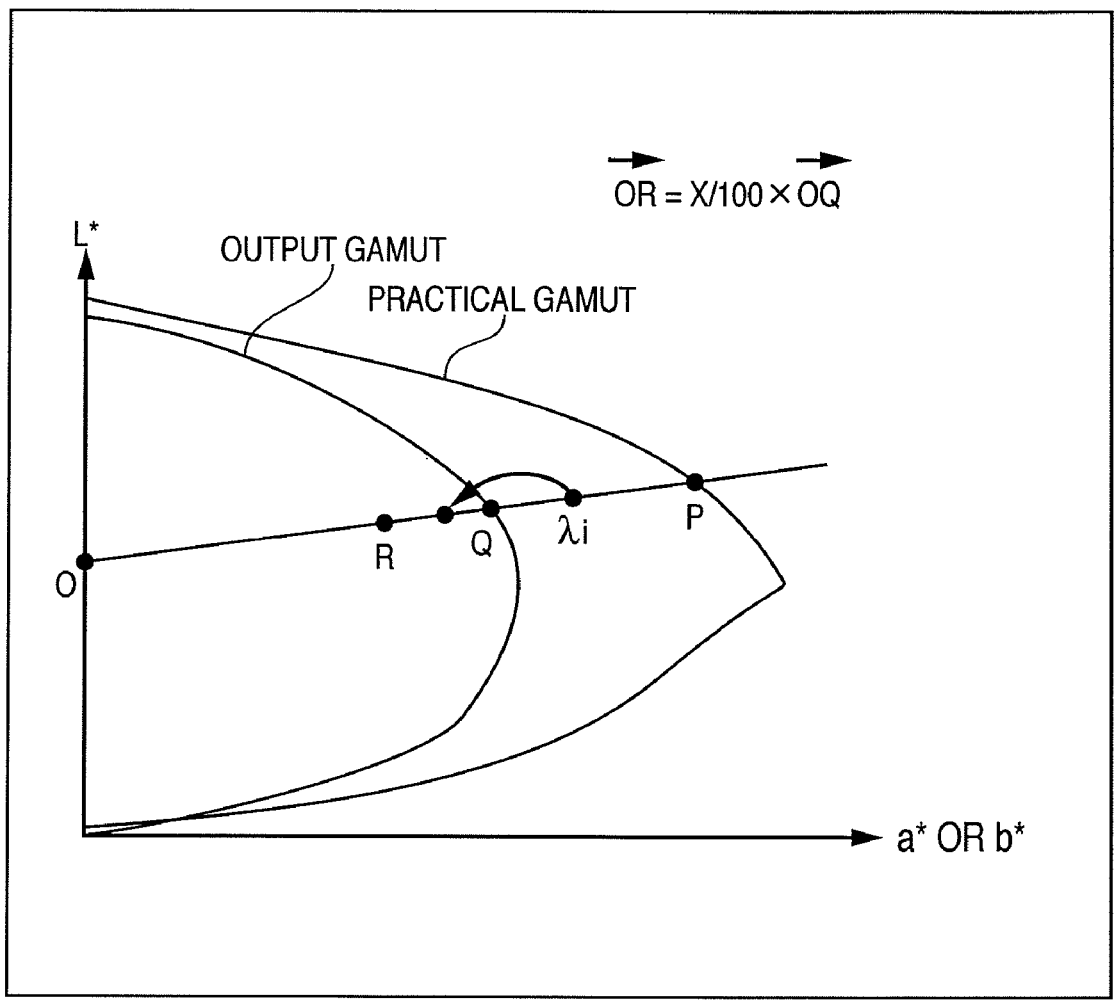
FIG. 11 is a graph showing the relationship between a convergent point O, an input point λi, a line Oλi, intersection points P and Q, and a switching point R by using an L*a* plane (or L*b* plane)

FIG. 11 is a graph showing the relationship between the convergent point O, input point λi, line Oλi, intersection points P and Q, and switching point R on a L*a* plane (or L*b* plane).

It is checked whether the input point λi exists on the line OR (S55). When the input point λi exists on the line OR, it is determined that the input point λi need not be compressed, and the output point (mapped data) is set to λi'(Li', ai', bi')=λi (Li, ai, bi) (S56).

When the input point λi does not exist on the line OR, an output point λi' obtained by mapping the input point λi into the output gamut is calculated (S57) by:

$$\lambda i' = OR + (\lambda i - OR)(QR/PR) \quad (4)$$

where OR is the distance between the points O and R, QR is the distance between the points Q and R, and PR is the distance between the points P and R.

A device RGB value of the output destination device is calculated from the output point λi' calculated in step S56 or S57, and is stored in the buffer memory 109 (S58). Calculation of the device RGB value will be described later.

Until it is determined in step S59 that all pixels of the input image data have been processed, the pixel number i is incremented (S60) and processing of steps S52 to S59 is repeated.

[Calculation of Device RGB Value]

Figure 12:
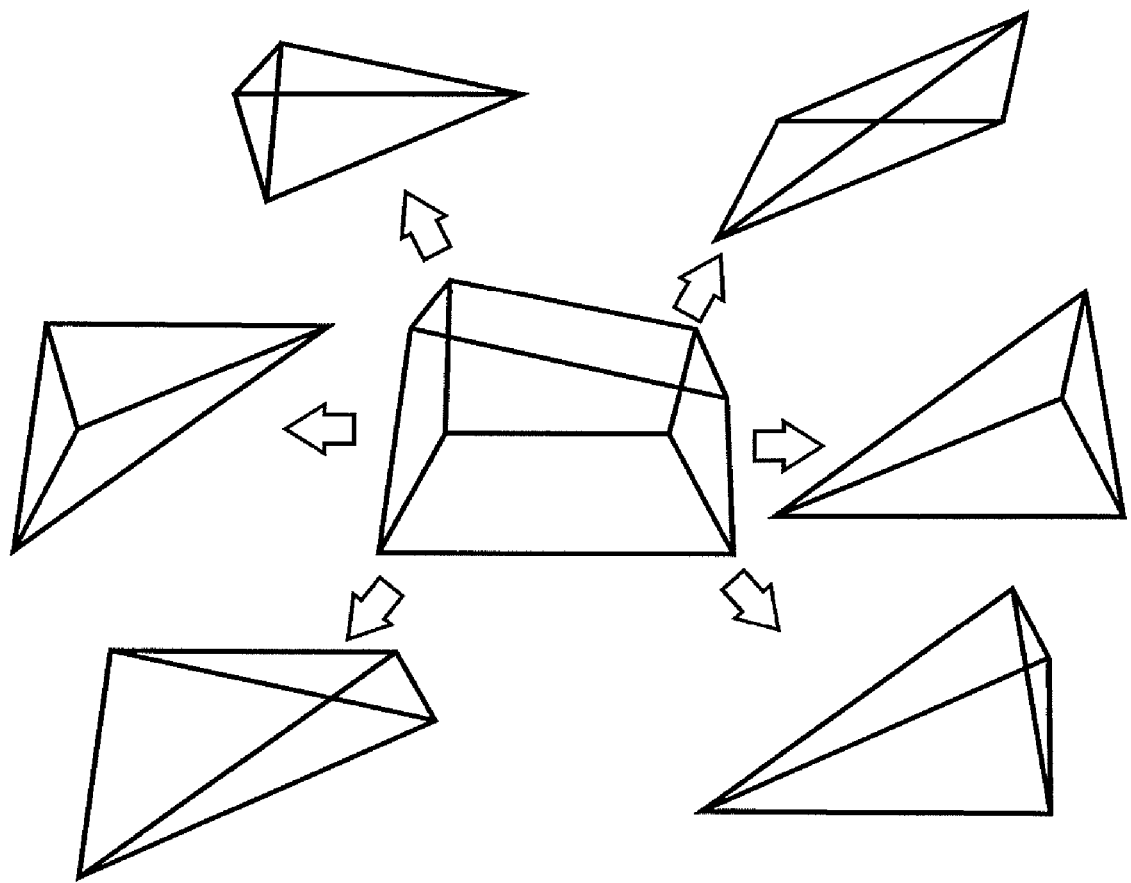
FIG. 12 is a view showing a hexahedron and tetrahedrons for calculating a device RGB value.

In this embodiment, output gamut data contains, as shown in FIG. 7, 9-sliced RGB data in the ranges of $0 \leq R, G, B \leq 255$, and output values (CIELAB values) of the output device which correspond to the RGB data. More specifically, output gamut data in this embodiment is constituted by 512 hexahedrons formed from 729 9-sliced RGB data. The hexahedron on the CIELAB space is divided into six tetrahedrons (see FIG. 12), and it is determined which tetrahedron includes the output point λi mapped into the output gamut.

Figure 13:
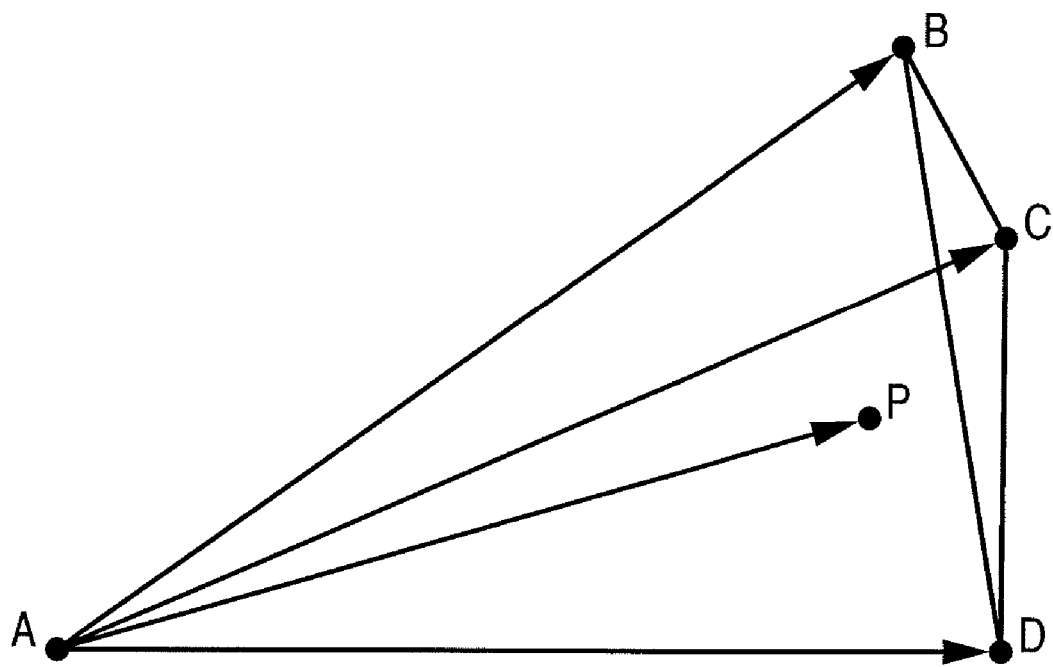
FIG. 13 is a view for explaining inside/outside determination using the tetrahedron.

FIG. 13 is a view for explaining inside/outside determination using the tetrahedron.

Let each vertex of the tetrahedron be A, B, C, and D, and let an output point be P. Then, the relationship between the vertexes and point P is expressed by:

$$\overrightarrow{AP} = s\overrightarrow{AB} + t\overrightarrow{AC} + u\overrightarrow{AD} \quad (5)$$

where $\overrightarrow{XY}$ is a vector directed from a point X to a point Y.

If the point P exists inside the tetrahedron ABCD, the following equations (6) and (7) hold:

$$s+t+u \leq 1 \quad (6)$$

$$s \geq 0, t \geq 0, u \geq 0 \quad (7)$$

When equations (6) and (7) hold, the point P is determined to fall inside the tetrahedron ABCD. Otherwise, the point P is determined to fall outside the tetrahedron ABCD. When the above-described tetrahedron inside/outside determination is executed for one output point λi' to all tetrahedrons forming a practical gamut, the tetrahedron including the output point λi" can be determined. When linear interpolation is performed from the RGB values of the vertexes of the tetrahedron by using s, t, and u in equation (5), the device RGB value of the output device corresponding to the output point λi' can be calculated.

In this manner, the practical gamut to be output from the image input device in practice is calculated for each image obtaining condition in advance. When an image sensed by the digital camera is to be output to an image display device or image output device, not the whole input gamut but a practical gamut corresponding to the image obtaining condition is mapped into the output gamut. As a result, without generating an unnecessary saturation drop or tone loss, a high-quality image can be displayed and output.

In addition, since not the gamut of the image itself but the practical gamut of the image input device corresponding to the image obtaining condition is mapped, no color change which depends on the color distribution of the image occurs.

Modification of Embodiment

In the above embodiment, processing has been described under the assumption that the input image is expressed on an sRGB (IEC61966-2-1) color space. However, the color space of an image to be input to the image processing apparatus 1 is not limited to this, and any color space can be used.

In the above example, the obtaining condition setting unit 102 obtains an obtaining condition of input image data from the obtaining condition storing part 1001. However, an obtaining condition may be read or input from, e.g., an external device.

In the above example, the gamut information holding unit 108 holds gamut information in advance. However, the input unit 101 may receive gamut information from an external device together with an input image. The gamut information holding unit 108 may hold a plurality of pieces of gamut information in advance, and gamut information corresponding to an input from an external device may be selected.

In the above example, the correspondence table holding unit 107 holds a table which shows correspondence between the obtaining condition and the practical gamut. However, a table may be received by the input unit 101 from an external device together with image data.

In the above example, a color of X % of the output gamut is stored in the process of the gamut mapping unit 106 and the remaining colors are mapped into (100−X)% region of the output gamut. However, the present invention is not limited to this, and any mapping method can be used as long as it performs mapping to preserve the tone as much as possible.

In the above example, a CIELAB space is used as a color space for mapping. However, for example, a CIELUV color space, an XYZ space, or a color appearance space such as CIECAM97, CIECAM97s, or CIECAM02 may be used.

A user may use retouching software to expand a color space to express an image into a wider color space, for example, expand sRGB to AdobeRGB, and then add a color outside a practical gamut. An image input device such as a digital camera which outputs image data on an AdobeRGB color space may be used. In these cases, a gamut of a wider color space such as AdobeRGB is set as a practical gamut with reference to information appended to the image data, and the above-described processing can be performed to map the data into a printer gamut or sRGB monitor gamut.

Other Embodiments

Note that the present invention can be applied to an apparatus comprising a single device or to system constituted by a plurality of devices.

Furthermore, the invention can be implemented by supplying a software program, which implements the functions of the foregoing embodiments, directly or indirectly to a system or apparatus, reading the supplied program code with a computer of the system or apparatus, and then executing the program code. In this case, so long as the system or apparatus has the functions of the program, the mode of implementation need not rely upon a program.

Accordingly, since the functions of the present invention are implemented by computer, the program code installed in the computer also implements the present invention. In other words, the claims of the present invention also cover a computer program for the purpose of implementing the functions of the present invention.

In this case, so long as the system or apparatus has the functions of the program, the program may be executed in any form, such as an object code, a program executed by an interpreter, or scrip data supplied to an operating system.

Example of storage media that can be used for supplying the program are a floppy disk, a hard disk, an optical disk, a magneto-optical disk, a CD-ROM, a CD-R, a CD-RW, a magnetic tape, a non-volatile type memory card, a ROM, and a DVD (DVD-ROM and a DVD-R).

As for the method of supplying the program, a client computer can be connected to a website on the Internet using a browser of the client computer, and the computer program of the present invention or an automatically-installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer is also covered by the claims of the present invention.

It is also possible to encrypt and store the program of the present invention on a storage medium such as a CD-ROM, distribute the storage medium to users, allow users who meet certain requirements to download decryption key information from a website via the Internet, and allow these users to decrypt the encrypted program by using the key information, whereby the program is installed in the user computer.

Besides the cases where the aforementioned functions according to the embodiments are implemented by executing the read program by computer, an operating system or the like running on the computer may perform all or a part of the actual processing so that the functions of the foregoing embodiments can be implemented by this processing.

Furthermore, after the program read from the storage medium is written to a function expansion board inserted into the computer or to a memory provided in a function expansion unit connected to the computer, a CPU or the like mounted on the function expansion board or function expansion unit performs all or a part of the actual processing so that the functions of the foregoing embodiments can be implemented by this processing.

While the present invention has been described with reference to exemplary embodiments, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2005-259602, filed Sep. 7, 2005, which is hereby incorporated by reference herein in its entirety.

What is claimed is:

1. A method of mapping image data into an output gamut, comprising:

using a processor to perform the steps of:

inputting image data expressed in a predetermined color space, the input image data which is converted from image data captured by a capturing device under a sensing condition, the capturing device which converts the captured image data by internal arithmetic operations using a parameter corresponding to the sensing condition, the input image data which is in a practical gamut corresponding to the sensing condition, and the practical gamut which is a part of an input gamut of the predetermined color space;

obtaining the sensing condition of the input image data;

obtaining practical gamut information corresponding to the sensing condition from a table which stores a relationship between a practical gamut and a sensing condition; and mapping the input image data into the output gamut using a mapping parameter calculated from the practical gamut information and output gamut information corresponding to the output gamut, wherein the practical gamut information corresponding to the sensing condition is obtained by converting pseudo-image data by the same arithmetic operations as the internal arithmetic operations of the capturing device using a parameter corresponding to the sensing condition and calculating a gamut represented by the converted pseudo-image data, and wherein the pseudo-image data are a plurality of color data generated by slicing respective color component data of the captured image data into a plurality of levels in ranges that the captured image data can assume.

2. The method according to claim 1, wherein the sensing condition includes at least one of a color temperature, a setting of a color temperature, ISO sensitivity, a shutter speed, a f-number, an aperture value of a sensing lens, and a strobe light setting.

3. The method according to claim 1, wherein the output gamut is a gamut of the printer.

4. A color processing apparatus for mapping image data into an output gamut, comprising:

an input section, arranged to input image data expressed in a predetermined color space, the input image data which is converted from image data captured by a capturing device under a sensing condition, the capturing device which converts the captured image data by internal arithmetic operations using a parameter corresponding to the sensing condition, the input image data which is in a practical gamut corresponding to the sensing condition, and the practical gamut which is a part of an input gamut of the predetermined color space;

a first obtaining section, arranged to obtain the sensing condition of the input image data;

a second obtaining section, arranged to obtain practical gamut information corresponding to the sensing condition from a table which stores a relationship between a practical gamut and a sensing condition; and a mapping section, arranged to map the input image data into the output gamut using a mapping parameter calculated from the practical gamut information and output gamut information corresponding to the output gamut, wherein the practical gamut information corresponding to the sensing condition is obtained by converting pseudo-image data by the same arithmetic operations as the internal arithmetic operations of the capturing device using a parameter corresponding to the sensing condition and calculating a gamut represented by the converted pseudo-image data, and wherein the pseudo-image data are a plurality of color data generated by slicing respective color component data of the captured image data into a plurality of levels in ranges that the captured image data can assume.

5. A non-transitory computer-readable medium storing a computer-executable program for causing a computer to perform a method of mapping image data into an output gamut, the method comprising the steps of:

inputting image data expressed in a predetermined color space, the input image data which is converted from image data captured by a capturing device under a sensing condition, the capturing device which converts the captured image data by internal arithmetic operations using a parameter corresponding to the sensing condition, the input image data which is in a practical gamut corresponding to the sensing condition, and the practical gamut which is a part of an input gamut of the predetermined color space;

obtaining the sensing condition of the input image data;

obtaining practical gamut information corresponding to the sensing condition from a table which stores a relationship between a practical gamut and a sensing condition; and mapping the input image data into the output gamut using a mapping parameter calculated from the practical gamut information and output gamut information corresponding to the output gamut, wherein the practical gamut information corresponding to the sensing condition is obtained by converting pseudo-image data by the same arithmetic operations as the internal arithmetic operations of the capturing device using a parameter corresponding to using the sensing condition and calculating a gamut represented by the converted pseudo-image data, and wherein the pseudo-image data are a plurality of color data generated by slicing respective color component data of the captured image data into a plurality of levels in ranges that the captured image data can assume.

* * * * *